UNITED STATES PATENT OFFICE.

GEORGE O. SEWARD, OF JERSEY CITY, NEW JERSEY, AND FRANZ VON KÜGELGEN, DECEASED, LATE OF HOLCOMBS ROCK, VIRGINIA, ASSIGNORS, BY MESNE ASSIGNMENTS, TO COLUMBIA-KNICKERBOCKER TRUST COMPANY, TRUSTEE, A CORPORATION OF NEW YORK.

PROCESS OF DETINNING.

14,071. Specification of Reissued Letters Patent. Reissued Feb. 15, 1916.

No Drawing. Original No. 851,946, dated April 30, 1907, Serial No. 365,603. Application for reissue filed October 30, 1915. Serial No. 58,942.

DIVISION B.

*To all whom it may concern:*

Be it known that I, GEORGE O. SEWARD, a citizen of the United States of America, formerly a resident of Holcombs Rock, county of Bedford, and State of Virginia, but now residing at Jersey City, in the county of Hudson and State of New Jersey, and FRANZ VON KÜGELGEN, (now deceased), late a subject of the German Emperor and a resident of Holcombs Rock, in the county of Bedford and State of Virginia, did jointly invent certain new and useful Improvements in Processes of Detinning, the Letters Patent for which were assigned to the undersigned REPUBLIC CHEMICAL COMPANY, INC., a corporation organized under the laws of the State of New York, and having its principal office at Pittsburgh, Pennsylvania, and of which the following is the inventors' specification.

This invention aims to economically recover the tin from tin scrap.

In our application No. 189,272, filed January 16, 1904, (Patent No. 915,029, granted March 9, 1909), we have described a process of detinning wherein the scrap is placed in a vessel and dry chlorin is admitted thereto, attacking the tin and forming stannic chlorid, which is condensed upon the walls of the vessel. It is essential to the success of this process that the temperature be carefully controlled and maintained within narrow limits. The reaction is attended by generation of heat, so that the temperature rises rapidly. The temperature must always be kept below the point at which iron-chlorid is formed. If, however, to avoid this result the temperature is kept too low, the detinning is slow and not so complete as it should be. In order to secure a good practical result, it is advisable to keep the temperature as high as possible, but always below the temperature at which the iron is attacked. In our said application we have described a means of avoiding the objectionable overheating, while keeping the temperature high enough for efficiency; namely, by limiting the amount of chlorin introduced, the inflow of chlorin being varied according to the temperature, so as to keep the heat up near to, but always below, the prohibitive point. Auxiliary to this is the external cooling of the vessel, as by the application of a water jacket, which hastens the process and gives further control of the temperature.

Our present invention provides another means of keeping the temperature within control; namely, by limiting the amount of tin scrap proportionally to the volume of the vessel or reaction chamber. Thus we control the reaction, and consequently the heat of reaction, by limiting the proportion of tin, instead of by limiting the proportion of chlorin. We also apply by preference external cooling, as by a water jacket.

In practising our invention we put a relatively small quantity of tin scrap into a chamber of given size, and introduce dry chlorin thereinto without limit. Even though the chlorin is present in volume much in excess of the reactive proportion, the heat generated by the reaction is dissipated through the contents of the tank, which keeps down the temperature. It is impossible to lay down any definite limits of proportion for the successful practice of our invention, but with a chamber of 40 cubic feet capacity a charge of 150 pounds of tin scrap has given successful results.

The resulting stannic chlorid may be removed by the means set forth in our said application, or in various other ways.

We claim as our invention:—

1. The recovery of tin from tin scrap by treating the latter in a closed vessel with dry chlorin to form stannic chlorid, and so limiting the quantity of scrap that the heat generated by the reaction is absorbed by the contents of the vessel and the temperature prevented from rising to a point at which the iron is attacked.

2. The recovery of tin from tin scrap by treating the latter in a closed vessel with dry chlorin to form stannic chlorid, so limiting the quantity of scrap that the heat generated by the reaction is absorbed by the contents of the vessel, and applying a cooling medium to cool said contents, whereby the temperature is kept below that at which the iron is attached.

3. The recovery of tin from tin scrap by treating the latter in a closed vessel with dry chlorin to form stannic chlorid, so limiting the quantity of scrap that the heat generated by the reaction is absorbed by the contents of the vessel, and water-cooling the vessel, whereby the temperature is kept below that at which the iron is attacked.

GEORGE O. SEWARD.
REPUBLIC CHEMICAL COMPANY, INC.,
By C. H. AYRES,
*Vice-Pres.*